United States Patent [19]

Birkestrand

[11] Patent Number: 5,265,987
[45] Date of Patent: Nov. 30, 1993

[54] CENTER DRILLING MACHINE FOR ROD STOCK

[76] Inventor: O. J. Birkestrand, 9347 E. Rush St., S. El Monte, Calif. 91733

[21] Appl. No.: 971,523

[22] Filed: Nov. 3, 1992

[51] Int. Cl.$^5$ .............................................. B23B 47/28
[52] U.S. Cl. .................................... 408/106; 408/111
[58] Field of Search ............... 408/103, 104, 106, 109, 408/110, 111; 279/123

[56] References Cited

U.S. PATENT DOCUMENTS

| | | | |
|---|---|---|---|
| 730,123 | 6/1903 | Hudson | 408/106 |
| 3,023,016 | 2/1962 | Multer et al. | 279/123 |
| 3,219,356 | 11/1965 | Wilterdink et al. | 279/123 |
| 3,366,393 | 1/1968 | Bullard, III | 279/123 |
| 3,884,592 | 5/1975 | Shulters | 408/106 |

FOREIGN PATENT DOCUMENTS 50186 10/1966 German Democratic Rep. ..................................... 408/106

*Primary Examiner*—Daniel W. Howell
*Attorney, Agent, or Firm*—Wagner & Middlebrook

[57] ABSTRACT

A chucking device for clamping a workpiece for center drilling has a plurality of jaws adjustably mounted for radial movement. A tool spindle is mounted in the center of the chucking device for drilling the workpiece.

6 Claims, 3 Drawing Sheets

CENTER DRILLING MACHINE FOR ROD STOCK

BACKGROUND OF THE INVENTION

The present invention relates to metal working machinery and more particularly to a center drilling machine for rod stock.

In preparing rod stock for machining on a lathe or the like it is necessary to provide a central anchorage on the end of the bar stock for the tail stock of the lathe. Such preparatory operation can be greatly expedited and simplified by the provision of a specialized machine capable of accommodating a wide range of sizes of bar stock, and of rapidly and accurately locating its center and drilling an indentation to service as anchorage at that point. It is the primary object of the present invention to provide such a machine. To do this job in the past required the use of large bore lathes or expensive hand layouts for machining precise centers in such bar stock.

SUMMARY OF THE INVENTION

The machine of the present invention is a portable drilling machine which includes chucking means for mounting the machine on an end of a section of such bar stock with the drill accurately located at the center of the bar stock end. The chucking means is capable of adjustment in very small increments to any of a wide range of stock sizes ranging, for example, from three quarters of an inch to thirteen inches in diameter and of rapid and accurate mounting on a bar stock end.

DETAILED DESCRIPTION OF THE INVENTION

Figure 1:
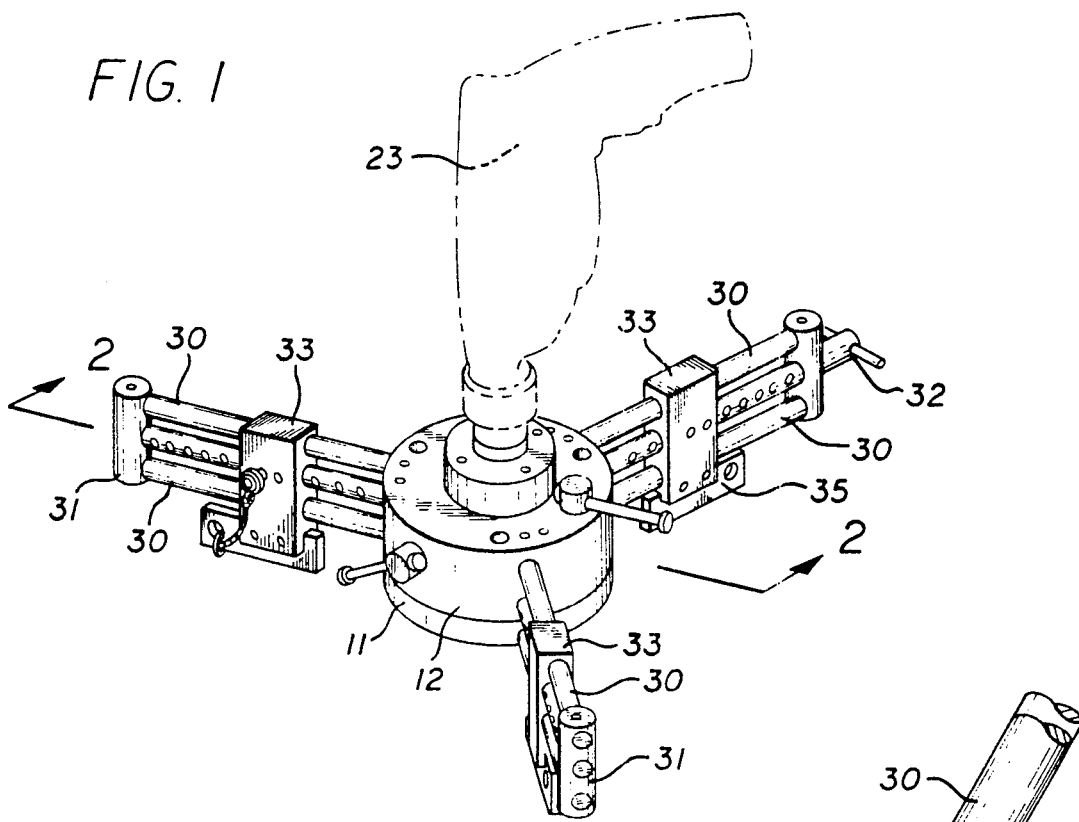
FIG. 1 is a view in perspective of the machine of the present invention.

The machine of the present invention comprises a central housing 10 composed of a frontal section 11 and a rear section 12 held together by means such as bolts 13. A drill spindle 15 (FIG. 2) is provided with a hexagonal drill recess 16 for receiving a fitting hexagonal end of a drill 18 which is frictionally retained in recess 16 by a O-ring 19. Drill spindle 15 also is provided with a hexagonal drive recess 20 designed to fit the hexagonal end of a drive shaft 22 of a conventional power source such as a conventional electric or air-powered drill motor 23 which is held in place by mating threads 24 on the housing of motor 23 and a motor bracket 25.

Drill spindle 15 is movable axially with respect to housing 10 means of a feed pinion 26 (FIG. 1) rockably mounted in housing 10 which meshes with cylindrical gear teeth 21 on the periphery of spindle 15 and operable by handle 27 to effect axial movement of spindle 15 and drill 18.

Figure 2:
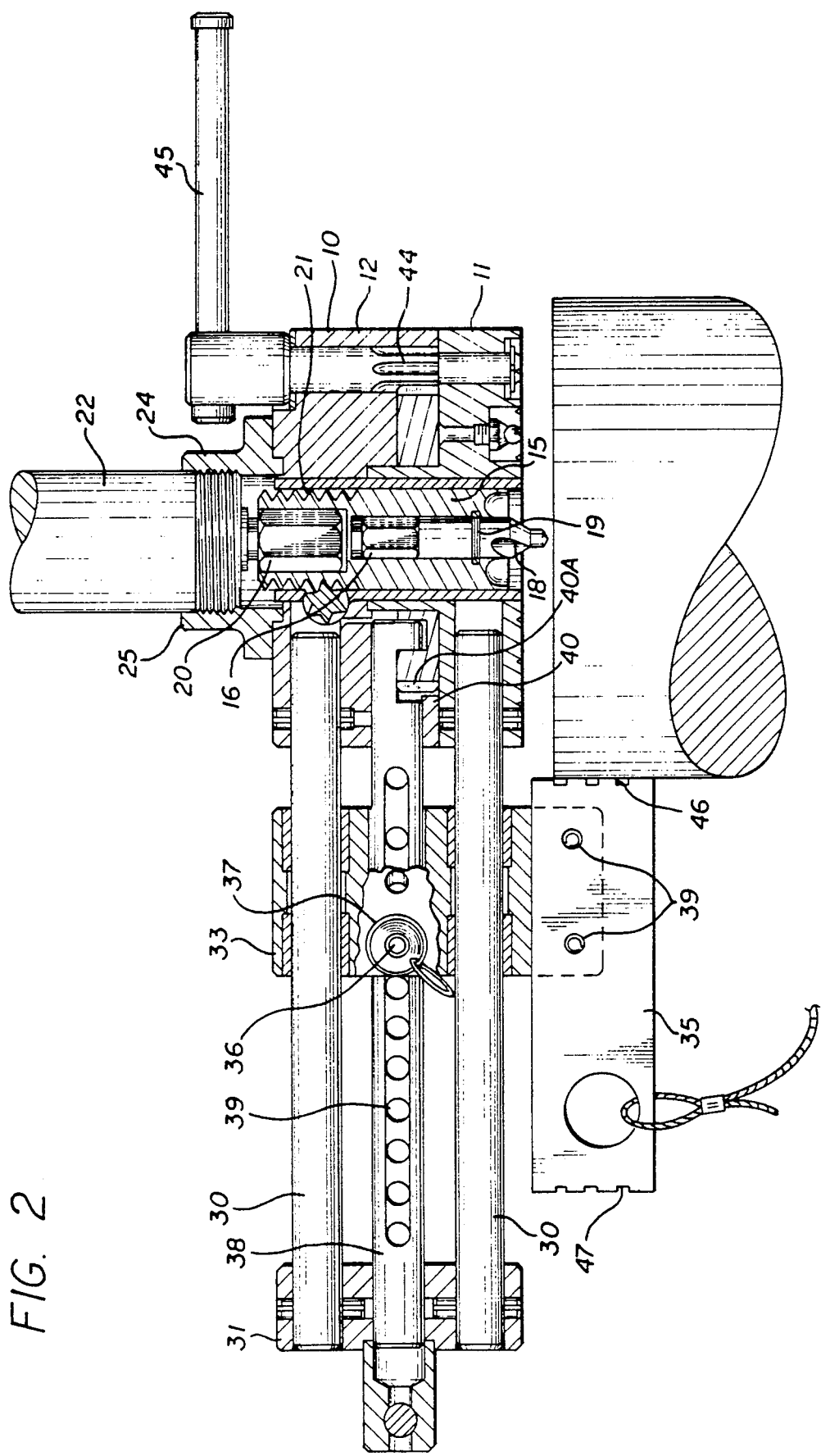
FIG. 2 is a fragmentary view, partially in section taken on the line 2—2 of FIG. 1, showing the machine mounted on the end of bar stock.
Figure 4:
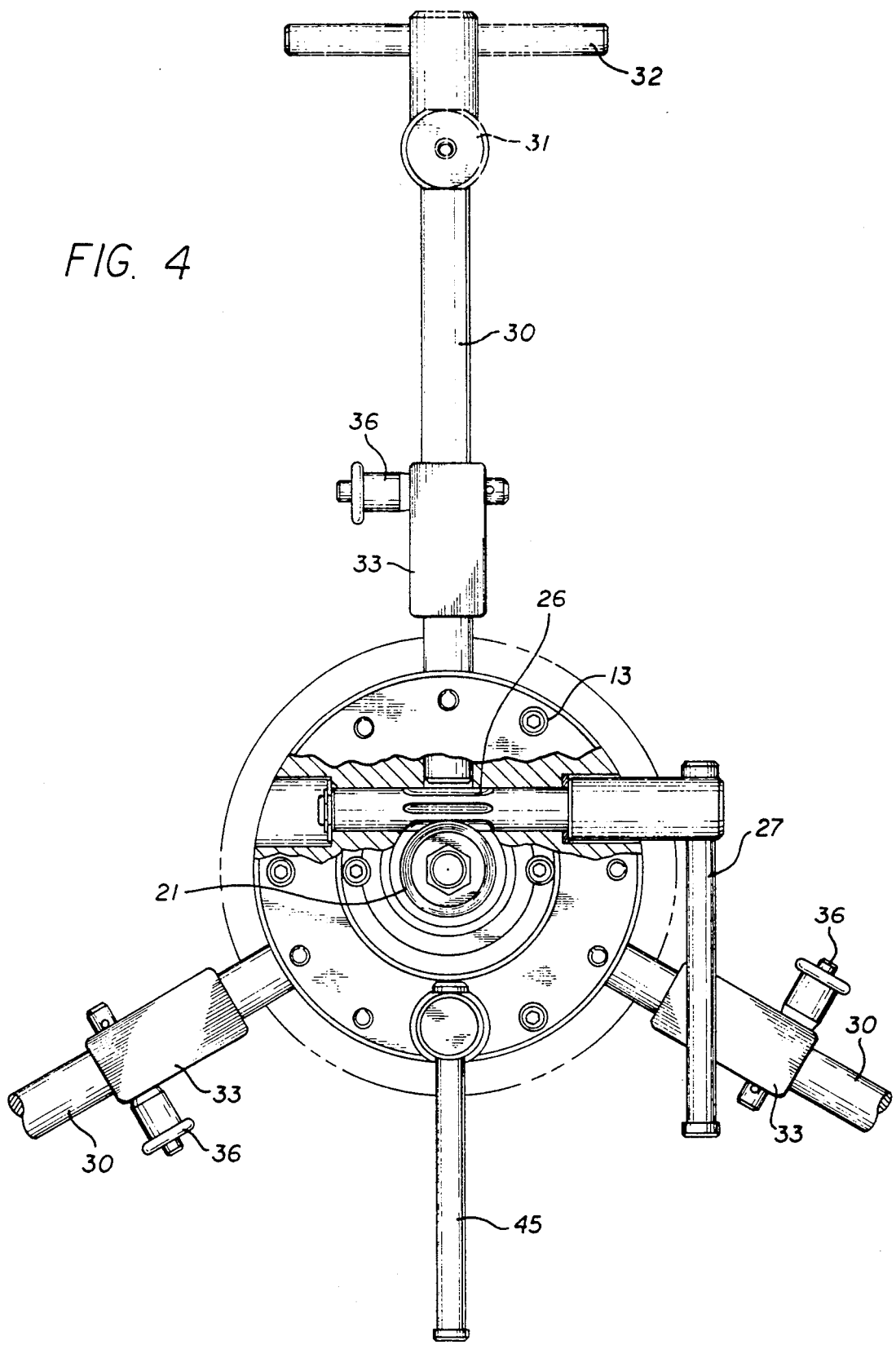
FIG. 4 is a fragmentary view in rear elevation and partially in section, of the machine of the present invention.

The machine of the present invention is provided with means for mounting it on the end of a section of bar stock so that the outer end of drill 18 will be exactly central of the end of a section of bar stock A (FIG. 2). For this purpose, parallel jaw ways 30 spaced 120 degrees apart with respect to the housing 10 are anchored in the housing and have their outer ends joined by hubs 31 one of which is provided with a carrying handle 32.

Slidably mounted on each pair of jaw ways 30 is a jaw carriage 33 and reversibly mounted on each of the jaw ways 33 by means of a pair of removable roll pins 34 is a chucking jaw 35. Each of the jaw carriages 33 is connected by means of a removable release pin 36 which passes through one of two holes 37 in carriage 33 and into one of a series of holes 39 in a jaw actuator rod 38 slidably mounted at its outer end in one of the hubs 31 and at inner end in the housing 10. The boles 39 preferably are juxtaposed to visible calibrations indicating one size of stock accommodated by placing the release pin 36 in that hole.

Figure 3:
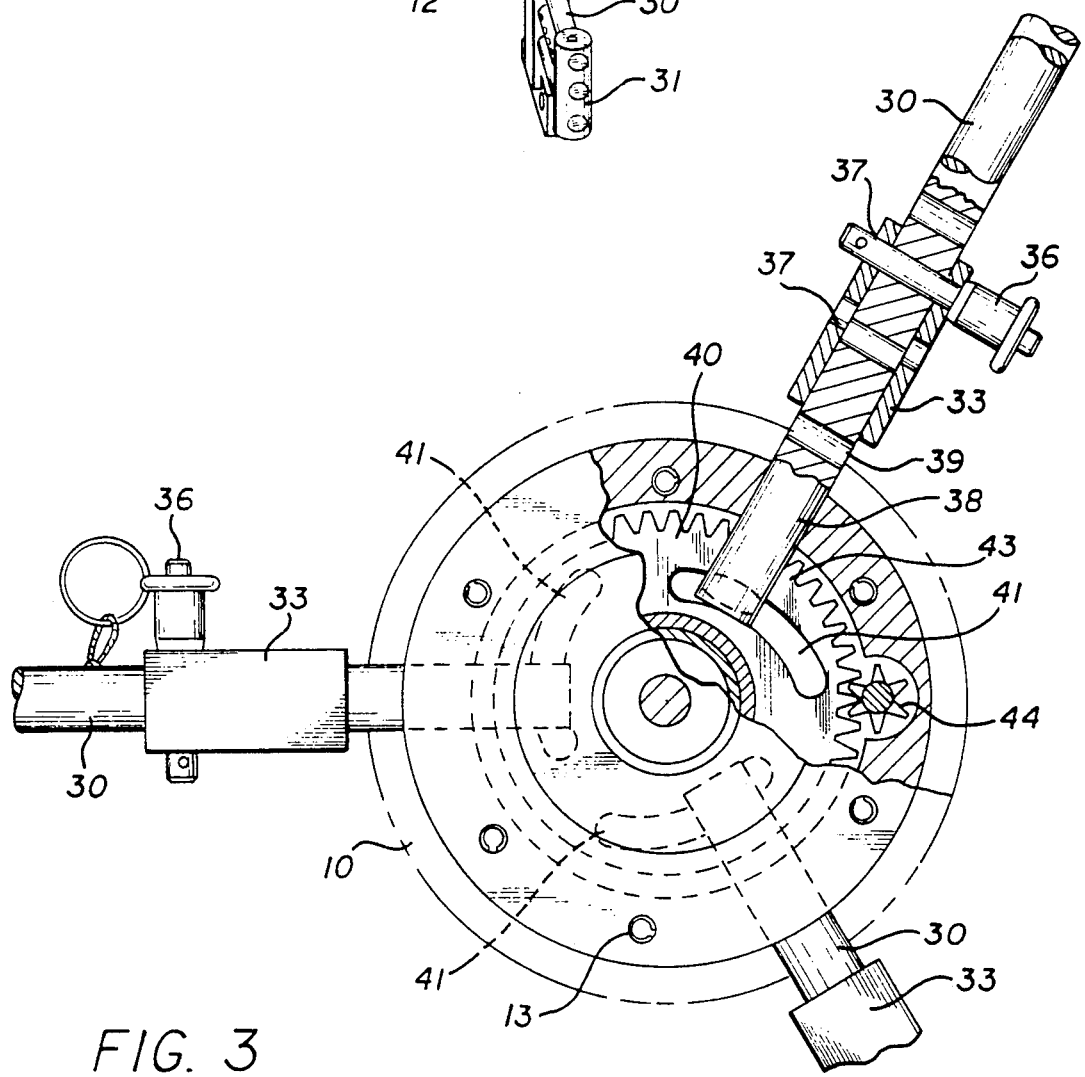
FIG. 3 is a fragmentary view in frontal elevation and partially in section if the machine of the present invention.

Means are provided for moving the jaw actuator rod 38 radially with respect to the housing to effect radial movement of the chucking jaws 35 and for retaining it in any position to which it has been moved. For this purpose there is provided a scroll gear 40 (FIGS. 2 and 3) having therein, for each of the jaw actuator rods 38, a cam slot 41 of decreasing radius in relation to the housing 10. Each of the jaw actuator rods 38 has an inner end 42 (FIG. 2) engaging the cam slot 41 so that oscillation of the scroll gear 40 will effect radial movement if all of the jaw actuator rods 38 simultaneously. The radius of cam slots 41 is such that force applied to rods 38 cannot displace scroll gear 40. Scroll gear 40 is provided on its periphery with teeth 43 (FIG. 3) meshing with a pinion 45 rotatable by external handle 45.

Means are provided for vary adjusting the device of the present invention to vary the range of sizes of bar stock which may be clamped into the chucking jaws of the machine, thus making it possible to accommodate a wide range of bar stock sizes.

As shown in FIG. 2, the chucking jaws 35 have serrated surfaces 46 and 47 on opposite ends with one end located further outwardly from the drill 18 than the other. This arrangement is such that by removing the roll pins 34, reversing the chucking jaws 35 and reinserting the pins, two ranges of sizes can be accommodated. In this way, for example, a low range of three quarters of an inch to 7 inches or a high range of 6 inches to 13 inches of bar stock diameters may be accommodated.

Adjustment within the range determined by the jaw orientation, as described above, may be effected by selecting the hole 39 in the actuator rod 38 into which the release pin 36 is inserted after passing through on of the holes 37 in the jaw carriage 33; the holes in the actuator rod being spaced, for example, a quarter inch apart.

Finally, a Vernier-like adjustment is obtained by spacing the two holes in the jaw carriage 37 so that when one of those holes is in alignment with one of the holes in the carriage actuator rod, the other hole in the jaw carriage will expose only a part of an underlying hole in the jaw actuator rod.

OPERATION

The machine of the present invention is designed so that even inexperienced operators may change from size to size of bar stock accommodated without tools or precision measuring instruments, and much more rapidly than previously was possible.

It is necessary, however, to be sure that all of the jaws are oriented in the same way; that all of the release pins 36 are in corresponding holes in the jaw actuator rods 38; and that those release pins are in corresponding holes in the jaw carriages.

To set up for a given stock size, it is then necessary only to pull the three release pins 36, insert one of them into one of the holes in the jaw carriage and thence into the hole in the carriage actuator rod calibrated next above the size of the stock to be processed, insert the other release pins into corresponding holes, and then clamp the machine onto the end of the stock with the point of drill 16 in contact with the bar stock to be drilled. The machine will then be properly positioned to start the motor, advance the drill into the stock, and remove the machine.

I claim:

1. An adjustable chucking device for clamping a work piece in a centered position with respect to a metal working tool comprising a central housing, means for mounting a tool spindle in said housing, a plurality of jaws adjustably mounted on said housing for radial movement with respect to said tool spindle mounting means, means for selectively retaining said jaws in any of a plurality of radially displaced positions with respect to said housing comprising a jaw actuating rod reciprocably mounted in said housing and means for releasably connecting said rod to said jaws in any of a plurality of relative positions of said rod and said jaws; and means common to said jaws for actuating said retaining means to clamp a workpiece between said jaws.

2. A chucking device according to claim 1 in which the means for connecting said rod and said jaws includes a plurality of spaced holes in said jaw actuating rod, a jaw carriage mounted on said rod and provided with a plurality of spaced holes overlying the holes in said rod; the spacing between the holes in said jaw carriage being different than the spacing between the holes in said rod.

3. An adjustable chucking device for clamping a workpiece, in a centered position with respect to a metal working tool comprising:

a central housing, means for mounting a tool spindle in said housing, a plurality of jaws adjustably mounted on said housing for radial movement with respect to said tool spindle mounting means, means for selectively retaining said jaws in any of a plurality of radially displaced positions with respect to said housing, comprising a jaw carriage associated with each of said jaws and means for mounting jaws thereon in any of a plurality of orientations with respect thereto, and means common to said jaws for actuating said retaining means to clamp a workpiece between said jaws.

4. A chucking device for clamping a work piece in a centered position with respect to a metal working tool comprising:

a central housing;

means for mounting a tool spindle in said housing;

a plurality of jaws;

means for adjustably mounting said jaws on said housing comprising a series of pairs of jaw ways anchored in said housing at 120 degree intervals circumferentially thereof;

a jaw carriage slidably mounted on each pair of said jaw ways for movement radially with respect to said housing;

means for mounting one of said jaws on each of said jaw carriages;

a jaw actuator rod associated with each pair of said jaw ways;

means for releasably connecting each of said jaw carriages to a jaw actuator rod at any of a series of positions along the length of said rod; and a common means for effecting in simultaneous radial movement of said jaw actuator rods to clamp a workpiece between said jaws.

5. A chucking device according to claim 4 including additionally, a tool spindle carried by said spindle mounting means and means for mounting a tool driving means in driving relationship therewith.

6. A chucking device according to claim 4 in which the means for connecting the jaw carriages and jaw actuator rods includes a plurality of spaced holes in said jaw actuating rods and said jaw carriage is mounted on said actuating rods and provided with a plurality of holes overlying the holes in said rod; the spacing of the holes in said jaw carriages being different than the spacing of the holes in said rod.

* * * * *